Nov. 29, 1938.     G. WAGNER     2,138,530
VALVE AND MOUNTING THEREFOR
Filed Dec. 19, 1935
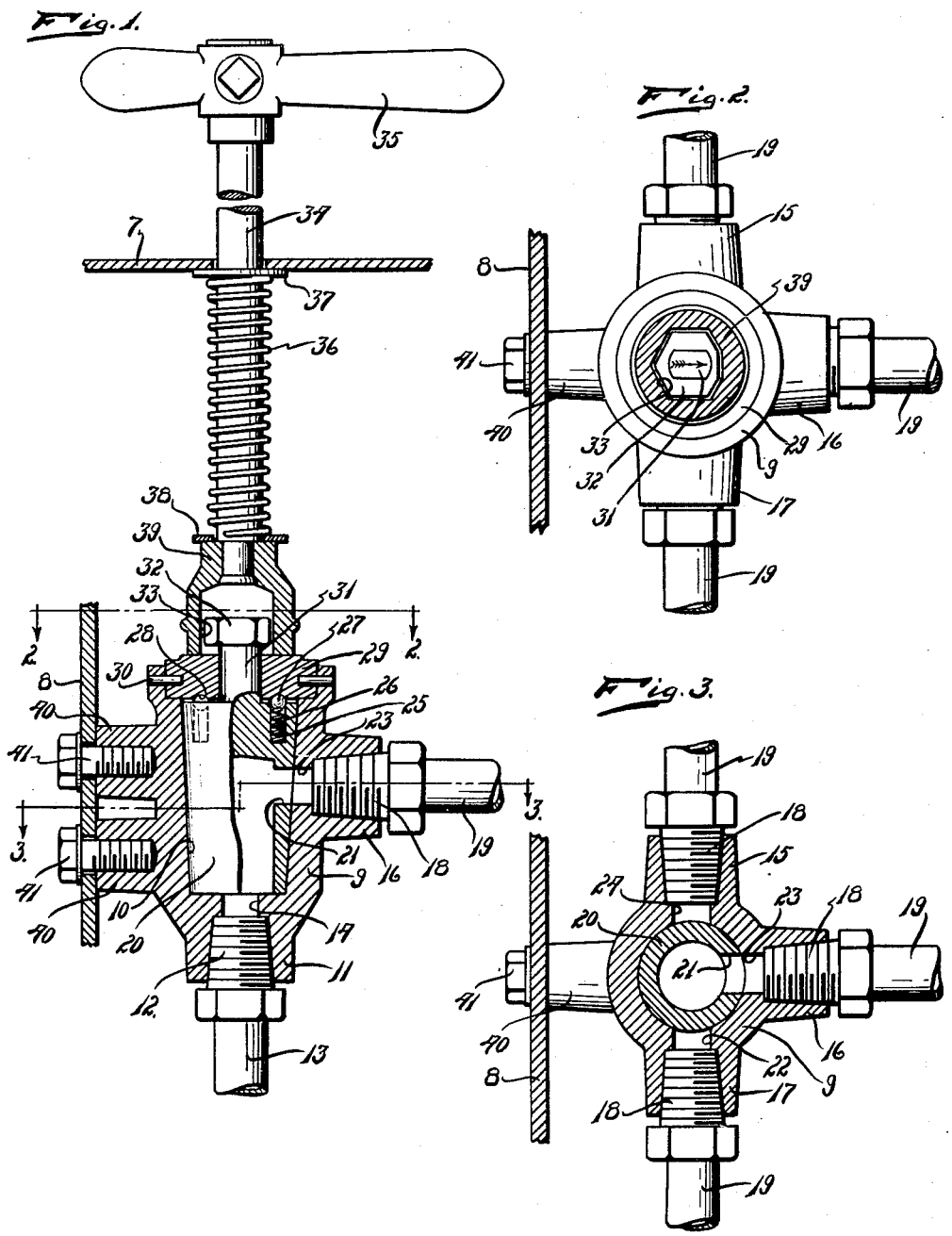
INVENTOR.
GEORGE WAGNER
BY
ATTORNEY.

Patented Nov. 29, 1938

2,138,530

UNITED STATES PATENT OFFICE 2,138,530

VALVE AND MOUNTING THEREFOR

George Wagner, Detroit, Mich.

Application December 19, 1935, Serial No. 55,134

2 Claims. (Cl. 137—139)

My invention relates to a new and useful improvement in a valve and mountings therefor so arranged and constructed that the valve may be mounted in a position accessible to the operator and operated with a minimum amount of effort. The invention is designed primarily for use on vehicles to serve as a means for controlling the flow of liquid fuel from various supply tanks to the fuel delivery pipe. Since the most convenient position for mounting the valve is beneath the floor boards or dash of the vehicles, a means must be provided above the floor for operating the valve and the present invention provides such a means which is simple in structure, economical of manufacture, durable, highly efficient in use, compact, light, easily and quickly installed, and easily operated.

Another object of the invention is to provide a valve operating device whereby a valve having a tapered plug may be rotated to desired positions without in any manner being subjected to an axial thrust.

Another object of the invention is the provision of a valve operating handle so constructed and arranged and co-ordinated relatively to the valve stem with which it co-acts as to prevent its operative engagement therewith until it has been arranged in a pre-determined position relative thereto.

Another object of the invention is the provision of a multiple valve having a plurality of conduits communicating therewith and adapted for being brought into registration with each other.

Other objects will appear hereinafter.

The invention consists in the arrangement and combination of parts hereinafter described and claimed.

The invention will be best understood by a reference to the accompanying drawing which forms a part of this specification, and in which, Fig. 1 is a central vertical sectional view of the invention.

Fig. 2 is a sectional view taken on line 2—2 of Fig. 1.

Fig. 3 is a sectional view taken on line 3—3 of Fig. 1.

In Fig. 1 I have illustrated the invention mounted on a vehicle comprising as a part of its structure a floor board or dash 7 positioned above and in spaced relation to a chassis rail 8. The valve proper comprises a housing 9 having the tapered bore 10. The housing is cup-shaped and projecting outwardly from the base is the internally threaded neck 11 in which is secured the fitting 12 connecting the pipe 13 in communication with the interior of the housing 9 through the passage 14. Projecting outwardly from the sides of the housing are internally threaded necks 15, 16 and 17, into each of which is threaded a fitting 18 connecting a delivery pipe 19 thereto. Rotatably mounted in the housing 9 is a tapered plug 20 which is hollow at its lower part and open at the bottom so as to always remain in communication with the passage 14. A lateral opening 21 is formed in the plug and upon proper rotation may be brought into registration with either of the passages 22, 23 or 24 so that either of the pipes 19 may selectively be brought into communication with the pipe 13. Consequently, if the pipes 19 are the delivery pipes, the pipe 13 would be the outlet pipe and capable of being brought into communication successively and selectively with the delivery pipes.

Formed in the upper face of the plug 20 are pockets 25 in each of which is positioned a spring 26 pressing against a ball 27 which is adapted to engage in the pockets 28 formed on the inner face of the cap 29 which is secured by the pins 30 on the open end of the housing 9. The construction is such that the pockets 28 located in position to, when the balls 27 are pressed therein, cooperate to resist a rotation of the plug 20 from one position to another. Upon exertion of the necessary rotative force on the plug, the balls would, of course, be forced downwardly into the pockets 26 and the plug rotated. There is thus provided yieldable means for resisting the rotation of the plug from one position to another.

Projecting upwardly from the plug 9 and extending through the cap 29 is a stem 31 on which is mounted the head 32 having a plurality of flat faces 33. It will be noted that the head 32 is septagonal.

The operating mechanism for rotating the plug consists of the stem 34 which projects through an opening formed in the floor or dash 7 and fixedly mounted on the upper end of the stem 34 is the handle 35 projecting from opposite sides thereof and extending to greater length at one side than the other.

Embracing the stem 35 is a spring 36, one end of which engages against the washer 37 and the other end of which engages against the washer 38. This washer 38 rests upon the end of a socket head 39 which is fixedly mounted on the lower end of the stem 34. This socket head is provided with flat faces to correspond with the flat faces on the head 32 so that it can seat over the head 32 only when in one position and when in this position would extend in the direction of the arrow indicated in Fig. 2 which is formed on the top of the head 32.

The housing 9 is provided with a pair of threaded bosses 40 into each of which is threaded a stud 41 projected through the chassis rail in position below the floor or dash 7. When the device is assembled as shown in Fig. 1 and the head 39 is in embracing relation to the head 32, the spring 36 will be under compression. Thus the operator has a means accessible from above the floor of the vehicle for rotating the valve plug 20. It will also be noted that the socket in the head 39 is of greater depth than the projection of the head 32 above the cap 29 so that the spring 36 will retain the head 39 in engagement with the cap 29 and no axial thrust will be delivered to the plug 20. This will prevent excessive wear and binding of the plug 20 resulting in a greater length of life for the plug 20 and a more efficient functioning of the plug when in use. Should it be desired to have access into the interior of the housing 9 at any time, the stem 34 may be lifted upwardly, further compressing the spring 36, so that the head 39 may clear the head 32.

It will be noted that the socket in the head 39 is slightly larger than the head 32 so that there is play between these parts. This permits a rocking of the stem 34 on the head 32 so that, if necessary, the stem 34 may be tilted slightly to the head when it is mounted.

In this way I have provided a multiple ported valve in which the valve outlets may be selectively operated from above the floor board of a vehicle and in which the various advantages enumerated are obtained. It will be noted that the member 8 serves as a supporting member and that it is positioned in spaced relation to the floor or stationary body 7.

While I have illustrated and described the preferred form of construction, I do not wish to limit myself to the precise details of structure shown, but desire to avail myself of such variations and modifications as may come within the scope of the appended claims.

Having thus described my invention, what I claim as new and desire to secure by Letters Patent is:

1. In a device of the class described, adapted for use with spaced apart parts, one positioned above the other, a valve housing fixedly mounted on the lower of said parts; a valve mechanism in said housing; a cap for said housing; a valve stem projecting upwardly from said mechanism through said cap and beyond said housing; an operating rod slidably projected through the upper of said stationary parts and movable axially relatively thereto; a head on the lower end of said operating rod having a pocket formed therein for engaging over the end of said valve stem and adapted upon rotation, while in engagement over the end of said valve stem, for rotating said valve stem in unison therewith, said pocket being of greater depth than the outwardly projecting portion of said valve stem for permitting the engagement of said pocket bearing head with said cap; and a spring mounted on said operating rod and normally maintaining the same moved axially for retaining said head in engagement with said cap.

2. In a device of the class described, adapted for use with spaced apart parts, one positioned above the other, a valve housing fixedly mounted on the lower of said parts; a valve mechanism in said housing; a cap for said housing; a valve stem projecting upwardly from said mechanism through said cap and beyond said housing; an operating rod slidably projected through the upper of said stationary parts and movable axially relatively thereto; a head on the lower end of said operating rod having a pocket formed therein for engaging over the end of said valve stem and adapted upon rotation, while in engagement over the end of said valve stem, for rotating said valve stem in unison therewith, said pocket being of greater depth than the outwardly projecting portion of said valve stem for permitting the engagement of said pocket bearing head with said cap; and a spring mounted on said operating rod and normally maintaining the same moved axially for retaining said head in engagement with said cap, said pocket being of a size slightly larger than the end of said stem projecting thereinto for permitting tilting of said operating rod relatively to said stem without preventing the rotation of said stem in unison with said rod.

GEORGE WAGNER.